United States Patent [19]

Coolbaugh

[11] Patent Number: 5,169,545
[45] Date of Patent: Dec. 8, 1992

[54] METAL PHENATE SULFIDES

[75] Inventor: Thomas S. Coolbaugh, Morrisville, Pa.

[73] Assignee: Mobil Oil Corporation, Fairfax, Va.

[21] Appl. No.: 753,133

[22] Filed: Aug. 30, 1991

[51] Int. Cl.[5] .................................. C10M 135/10
[52] U.S. Cl. ............................ 252/33.2; 252/33
[58] Field of Search ................... 252/33, 33.2

[56] References Cited

U.S. PATENT DOCUMENTS

| 2,680,096 | 6/1954 | Walker et al. | 252/42.7 |
| 2,680,097 | 6/1954 | Stewart | 252/42.7 |
| 3,408,297 | 10/1968 | Sheldahl | 252/33 |
| 4,251,379 | 2/1981 | LeCoent et al. | 252/33 |
| 4,737,303 | 4/1988 | Thaler et al. | 252/33 |
| 5,024,773 | 6/1991 | Liston | 252/33 |

FOREIGN PATENT DOCUMENTS 85102059 9/1986 China.

Primary Examiner—Ellen McAvoy
Attorney, Agent, or Firm—Alexander J. McKillop; Charles J. Speciale; Jessica M. Sinnott

[57] ABSTRACT

Overbased metal phenate sulfides, having a higher alkalinity, reflected by the total base number (TBN), and having good viscosity characteristics, are synthesized with a dispersant comprising a dialkyl metal sulfosuccinate or combination of the dialkyl metal sulfosuccinate and a metal hydrocarbylsulfonate. The preferred dialkyl metal sulfosuccinate is dioctyl-sodium sulfosuccinate. The Preferred metal hydrocarbylsulfonate is calcium dinonylnaphthalenesulfonate which is added to impart age and heat stability to the product. The overbased metal phenate sulfides are suitable as lubricant and functional fluid additives.

22 Claims, 1 Drawing Sheet

METAL PHENATE SULFIDES

FIELD OF THE INVENTION

The invention is directed to metal phenate sulfides with improved viscometric properties and higher alkalinity. More specifically, the invention is directed to incorporating a dispersant, preferably at least one metallic dispersant, namely a dialkyl-metal sulfosuccinate, and, optionally, a metal hydrocarbylsulfonate in a metal phenate sulfide reaction mixture to achieve metal phenate sulfides.

BACKGROUND OF THE INVENTION

The oxidation of a lubricating oil often leads to the formation of oil-insoluble products which form particles that separate from the oil in a form of sludge, lacquer or varnish-like coating on engine parts.

Neutral and overbased alkaline-earth metal phenate sulfides have been known for their excellent dispersing properties and the ability to neutralize engine acids. Use has been found for these compositions primarily as additives in lubricating oils.

Overbased metal phenate sulfides contain high levels of alkali or alkaline earth metal and possess strong detergent power and an even greater capacity to neutralize acidic contaminants than the neutral metal phenate sulfides. However, overbased metal phenate sulfides which contain high levels of metal have been found to be undesirably viscous in many cases. The high viscosity may be related to the higher solids content of overbased products as well as the presence of multivalent metal salts which may crosslink with other molecules resulting in a more viscous product. Additionally, it has been found that above a certain level of alkalinity undissolved solids become an increasing problem. It would be desirable to increase the alkalinity level of these additives without increasing their viscosity.

The conventional method of making overbased phenate sulfide detergents involves mixing long chain alkyl substituted phenols, a source of sulfur and an excess of metallic base. Carbonation of the reaction mass follows to increase the amount of metal base homogeneously dispersed in the final product.

SUMMARY OF THE INVENTION

This invention is directed to overbased metal derivatives of phenate sulfides which have a high alkalinity and improved viscosity properties. Specifically, the invention is directed to a highly alkaline low viscosity overbased phenate sulfide comprising the reaction product of at least one of a source of alkylated phenol, a source of sulfur, a source of an alkali or alkaline earth metal containing reagent and a dispersant composition which includes a dialkyl-metal sulfosuccinate. The invention is also directed to a process for preparing metal phenate sulfides which comprises mixing at least one of a source of alkylated phenol, a source of sulfur, an alkali or alkaline earth metal-containing reagent and a dispersant composition which includes a dialkyl-metal sulfosuccinate.

A feature of the invention is the incorporation of a dispersant which includes a dialkyl-metal sulfosuccinate in a reaction mixture for making phenate sulfides to produce highly alkaline overbased phenate sulfides which have good viscosity properties.

An advantage of the invention is that highly alkaline phenate sulfides which have improved viscosity characteristics can now be manufactured by including a dispersant composition which includes a dialkyl-metal sulfosuccinate in the phenate sulfide reaction mixture.

The phenate sulfides of the invention can be utilized in various lubrication oils for internal combustion engines; namely heavy duty diesel engines.

DETAILED DESCRIPTION OF THE INVENTION

Figure 1:
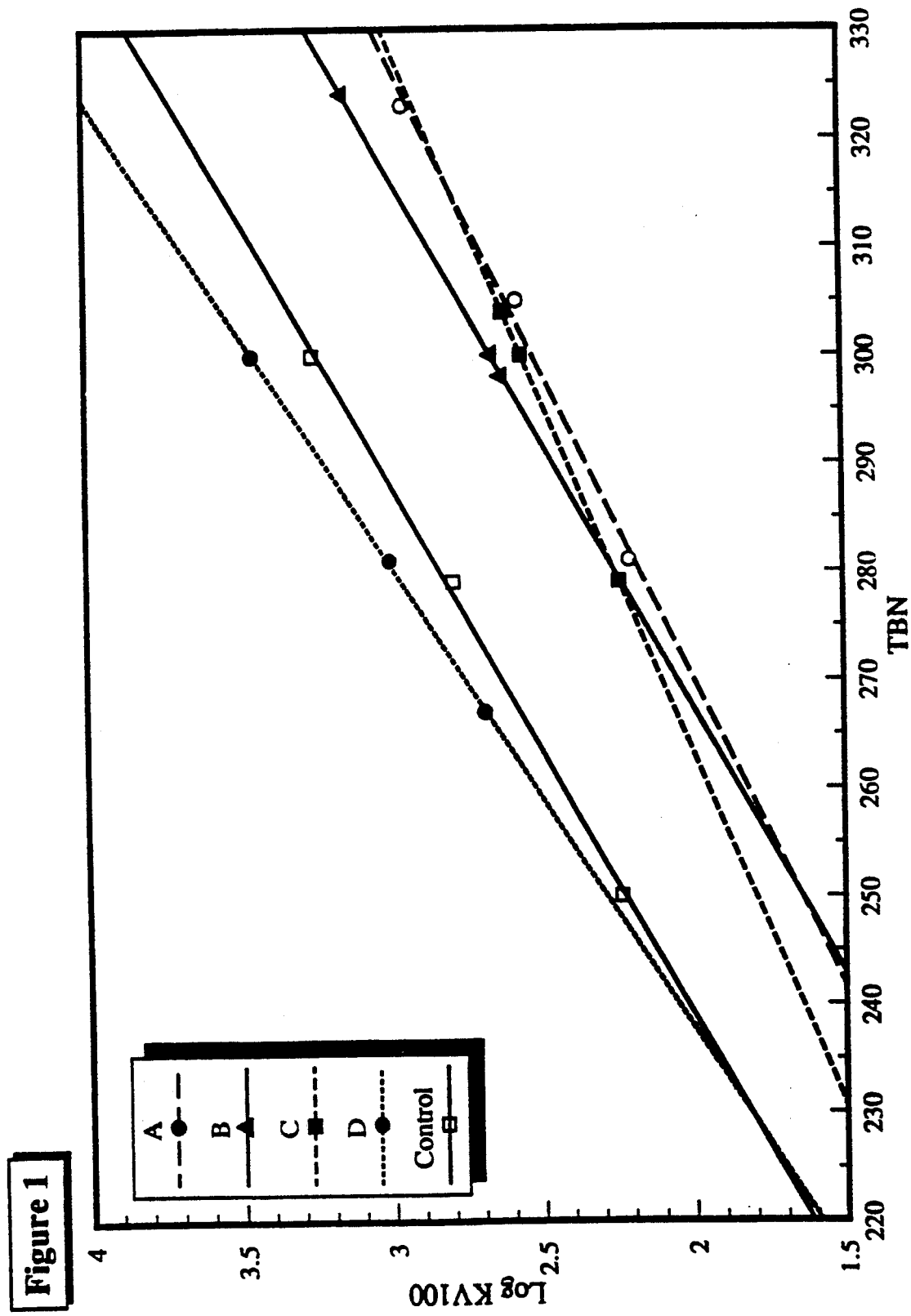
FIG. 1 is a graph of the total base number (TBN) and kinematic viscosity (Log $kV_{100}$) which illustrates the effect of the dispersants (dioctyl-sodium sulfosuccinate and dinonylnaphthalenesulfonate) on the properties of the metal phenate sulfides made in accordance with the invention.

The source of alkylated phenol from which the products of this invention are derived has the formula:

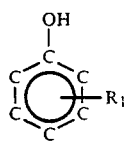

where $R_1$ is an alkyl group. Preferably $R_1$ is a long chain alkyl group which contains at least 6 carbon atoms, ranging from 6 to 50 carbon atoms, preferably 9 to 20 carbon atoms. The phenol may be alkylated by any known technique. Known alkylation methods include reaction between olefins or alkyl halides and phenols. The reaction can be conducted in the presence of a catalyst to promote the reaction such as a Lewis acid, e.g. aluminum chloride, boron trifluoride, hydrogen fluoride and the like. The long chain alkyl group may be derived from propylenes, butenes, pentenes, hexenes, decenes, dodecenes, octadecenes, eicosenes and olefins of a maximum of 50 carbon atoms. It is anticipated that suitable alkyl phenols may also contain cyclic hydrocarbyl groups such as phenyl and cyclohexyl.

The alkyl phenol sulfide intermediates are prepared by reacting the alkylated phenol with at least one of a source of sulfur such as, elemental sulfur or a sulfur compound such as sulfur dichloride. The amount of sulfur used in the synthesis mixture is at least 100 mole % based on the alkyl phenol. Preferably, the amount of sulfur ranges from 150 to 200 mole %.

The resulting alkylphenol sulfide is further reacted with at least one of a source of an alkali or alkaline earth metal-containing reagent to form the metal alkyl phenate sulfide. Suitable alkali or alkaline earth metal-containing materials include alkali or alkaline earth metal reagents which can contain any member of the alkali or alkaline earth metals such as sodium, potassium, lithium, calcium, magnesium, strontium and the like. The alkali or alkaline earth metal material can be an oxide, hydroxide, alcoholate or amine. Representative examples include calcium oxide and calcium hydroxide. Calcium hydroxide is preferred.

The amount of alkali or alkaline earth metal-containing material which is to be used in the reaction mixture depends on the preferred degree of alkalinity of the final product. The preferred alkalinity determines the stoichiometry of the starting materials. It is most advantageous to incorporate the highest mole % of metal to phenate sulfide as possible. Although the amount of metal is limited by strict viscosity and flow specifications, in accordance with the instant invention, a higher ratio of metal can be used in the reaction mixture without unduly increasing the product viscosity. Thus, the amount of alkali or alkaline earth metal which can be used in the instant invention is at least 150%, ranging from 150 to 350%, preferably from 180 to 250% by mole of the alkyl phenol.

Critical to the invention is the incorporation of a dispersant composition which includes a sulfosuccinate which aids in the dispersion of the solids thereby facilitating the manufacture of a highly alkaline product of acceptable viscosity.

The sulfosuccinate dispersant is, preferably, a dialkyl-metal sulfosuccinate which has the general formula:

$$\left[ \begin{array}{c} R_2CO_2-CH_2-CH-CO_2R_3 \\ | \\ SO_3^- \end{array} \right]_n X$$

The alkyl group of the sulfosuccinate represented by $R_2$ and $R_3$ can contain at least 4 carbon atoms, ranging from 4 to 16 carbon atoms, preferably 4 to 13 carbon atoms. X represents an alkali or alkaline earth metal and n is the valence of X. $R_2$ and $R_3$ are aliphatic groups which may be straight chain or branched and can be the same or different. Representative examples of alkyl groups include butyl, pentyl, hexyl, octyl, decyl and dodecyl as well as branched alkyl groups such as ethylhexyl. The sulfosuccinate reacts and decomposes during the synthesis. A by-product of the decomposition reaction is an alcohol which is removed from the final product. To facilitate removal of the alcohol the alkyl group is preferably of a low carbon number, i.e. at least $C_4$, ranging from $C_4$ to $C_{13}$ and not exceeding $C_{16}$.

The metal component of the alkyl metal-sulfosuccinate which is represented by X can be any metal selected from the alkali metals and alkaline earth metals groups, Group IA and Group IIA of the Periodic Table of the Elements, including lithium, sodium, potassium calcium, magnesium, beryllium, strontium and barium.

The alkyl metal sulfosuccinates are derived by esterification of maleic anhydride with an alcohol followed by addition of a metal bisulfite. The succinates can also be obtained commercially. The preferred succinate is dioctyl-sodium sulfosuccinate, which is also known as di(2-ethylhexyl) sodium sulfosuciniate. Dioctyl-sodium sulfosuccinate has the following structural formula:

$$C_8H_{17}OOCCH_2CH(SO_3Na)COOC_8H_{17}$$

The incorporation of the dialkyl metal sulfosuccinate provides a higher alkalinity content product without increasing the product viscosity.

The amount of dialkyl-metal sulfosuccinate in the reaction mixture depends on the desired viscosity and preferred degree of alkalinity. In the very highly alkaline product, i.e., that which is greater than 280 total base number, the amount of the dialkyl-metal sulfosuccinate should be at least 1% ranging from 2 to 20%. The preferred amount of dialkyl-metal sulfosuccinate is 2 to 16% based on the total amount of alkylphenol.

The dispersant composition can also include a second dispersant, preferably another metallic dispersant, along with the dialkyl-metal sulfosuccinate. This dispersant should have properties which facilitate suspension of the metal in solution, promote compatibility of the dispersed metal in the final product and help the product resist aging. A suitable dispersant is a metal hydrocarbylsulfonate.

The metal hydrocarbylsulfonate can be generally represented by the formula $$[R_4-SO_3]_m Y$$

where Y is a group IA metal or a group IIA metal, m is the valence of Y and $R_4$ is the hydrocarbyl group which can contain 8 to 50 carbon atoms.

The hydrocarbyl group of the metal hydrocarbylsulfonate, represented by $R_4$, contains at least 8 carbon atoms, ranging from 8 to 50 carbon atoms, preferably from 12 to 36 carbon atoms. The hydrocarbyl is preferably aromatic with at least one alkyl substituent bonded to the aromatic. Suitable alkyl substituents contain 4 to 16 carbon atoms, a representative example of which is nonyl. Aromatic hydrocarbyls contemplated are phenyl and fused ring aromatics such as naphthalene. The metal, represented by Y, is a group IA or IIA metal of the Periodic Table of the Elements such as beryllium, magnesium, calcium, strontium, barium and radium as well as lithium, sodium and potassium. The preferred sulfonate is calcium dinonylnaphthalene sulfonate which is made by sulfonating dinonylnaphthalene with acetyl sulfate, for example.

The amount of metal hydrocarbylsulfonate used can depend on the desired degree of age resistance as indicated by solution clarity and is relative to the amount of dialkyl-metal sulfosuccinate used in the preparation of the phenates. In the preferred embodiment, the ratio of dialkyl-metal sulfosuccinate to metal hydrocarbylsulfonate is expressed in molar terms of at least 1:1, ranging from 2:10 and preferably from 2:5 moles of dialkyl-metal sulfosuccinate per mole of metal hydrocarbylsulfonate.

The reaction temperature should be at least 100° C., ranging from 110° to 150° C., preferably from 115 to 135° C. This temperature should be maintained until liquid evolution ceases, and then raised to at least 160° C. ranging from 165° to 150° C.

Any suitable diluent or solvent can be used in which the metal phenate sulfide has some degree of solubility. Suitable solvents include mineral oils of about 4 cSt at 100° C., and aromatic hydrocarbons such as, toluene or xylenes. The solvent may also comprise a monohydric alcohol such as isodecyl alcohol or a diol such as ethylene glycol. The alcohols are useful in the reaction mixture to increase the solubility of the reactants and promote reaction, thereby increasing the product yield. A combination of the foregoing solvents can also be used, such as a combination of mineral oil, ethylene glycol and isodecyl alcohol.

In making the final products, carbon dioxide is introduced to the reactor while a temperature of at least 160° C., ranging from 165°-180° C. is maintained for a period of at )east 60 minutes, preferably from 100 to 250 minutes. The amount of carbon dioxide added to the reaction mixture can range from 0.25 to 1.5 moles, preferably from 0.5 to 1.0 mole of carbon dioxide per mole of basic metal reagent.

The dispersant composition can be added to the reaction mixture at any time during the synthesis. However, the dispersant can be added initially along with the starting materials, gradually during the carbon dioxide addition step or a combination of the two steps can be used. For example, 10% can be added initially with addition of the remaining 90% during the carbonation step.

For optimum performance of the additive in lubricating oils, the viscosity characteristics of the final metal phenate should not exceed about 1000 cSt at 100° C., ranging from 100 to 700 cSt, preferably from 200 to 500 cSt while the total base number can be as high as 350, ranging from 250 to 350, preferably from 290 to 350.

The metal phenates of the instant invention may be employed in lubricating oil compositions, both mineral oil and synthetic oils, as well as in greases. Specific functional lubricants which will benefit from the additives include marine diesel lubricants which require a good dispersant with strong antioxidant properties, railroad engine lubricants, automobile lubricants and other functional fluids.

The following examples describe the invention in more complete detail.

EXAMPLE 1

To a 2L resin kettle equipped with variable speed stirrer, heater, thermocouple, condensor, Dean-Stark trap, a caustic scrubber and nitrogen, carbon dioxide and vacuum inlets was charged 400.0 g of dodecylphenol, 282.0 g of mineral oil, 180 g of isodecyl alcohol, 44.0 g of calcium dinonylnaphthalenesulfonate (50% in oil), 80.0 g of dioctyl-sodiumsulfosuccinate, 253.6 g of calcium hydroxide and 80.4 g of elemental sulfur. The mixture was purged with nitrogen at a flow rate of about 50 mL per minute and the temperature was raised to 121° C. with stirring.

When the temperature reached 121° C., 104.0 mL of ethylene glycol were fed to the reaction mixture via syringe over a period of one hour. Following this, the temperature was raised to 177° C., the nitrogen flow rate was increased to approximately 100 mL per minute for a period of two hours. The temperature was then maintained at 177° C. while the pressure was reduced to about 500 mm of Hg. A two-phase distillate (63 g) composed of water, ethylene glycol, ethylhexyl alcohol and isodecyl alcohol was collected over a thirty minute period.

The pressure was then increased to atmospheric by introduction of nitrogen. Carbon dioxide (114.8 g) was then fed over a two hour period at 177° C. During the carbon dioxide addition the reaction mixture changed from a hazy appearance to one of transparency. When addition was complete, the pressure was reduced to 40 mm Hg and the temperature was increased to about 200° C. Approximately 220 g of a two-phase distillate was collected over a two-hour period. The distillate was composed primarily of isodecyl alcohol and ethylene glycol.

The reaction mixture was allowed to cool to approximately 100° C., diluted with toluene, suction filtered through Celite 545 and solvent was then removed under reduced pressure to yield about 1 Kg of product as a viscous, dark amber fluid. Total base number=323 and $KV_{100}=878$ cST. The base number and viscosity were then adjusted by addition of mineral oil to 305 TBN and 372 cST. The product was designated Sample A.

EXAMPLE 2

Calcium phenate sulfide was made as described in Example 1 with the exception that 60% of the amount of dioctyl-sodium sulfosuccinate was used (12% based on alkyl phenol). The product was designated Sample B.

EXAMPLE 3

Calcium phenate sulfide was made as described in Example 1, with the exception that only dioctyl-sodium sulfosuccinate was used. The product was designated Sample C.

EXAMPLE 4

Calcium phenate sulfide was made as described in Example 1 with the exception that only calcium dinonylnaphthalenesulfonate was used. The product was designated Sample D.

EVALUATION OF THE PRODUCTS

The alkalinity of the products of each of the examples was determined by titration with acid and was expressed as total base number (TBN) based on milligrams of KOH per gram of sample.

The products were subjected to aging in a standard reference oil for 96 hours at 70° C., and 4% loading in a standard reference oil.

Table 1 presents a summary of the composition and properties of the products of each of the examples and a commercially available calcium phenate sulfide (designated the control).

TABLE 1

| Sample: | A | B | C | D | Control |
|---|---|---|---|---|---|
| % DDP | 31.9 | 31.7 | 32.2 | 33.7 | 36.5 |
| % DiOSS | 6.4 | 3.8 | 3.9 | 0.0 | 0.0 |
| % DiNNS | 1.8 | 1.7 | 0.0 | 1.9 | 0.0 |
| $KV_{100}$ | 372 | 418 | 406 | 475 | 250 |
| TBN | 305 | 298 | 306 | 267 | 254 |
| % S | 4.06 | 3.97 | — | 4.37 | 3.6 |
| % Ca | 11.42 | 10.81 | — | 9.84 | 9.2 |
| % $CO_2$ | 6.48 | 4.95 | — | 3.14 | 4.5 |
| Oven Storage Appearance | very slightly hazy | clear | hazy | clear | clear |

DDP = dodecylphenol
DiOSS = dioctylsodium sulfosuccinate
DiNNS = calcium dinonylnaphthalene sulfonate As shown in Table 1, all of the test samples contained a higher total base number than the control, a commercial calcium phenate. Sample C which contained only dioctyl-sodium sulfosuccinate possessed a slightly lower viscosity and slightly higher total base number (TBN) than Sample B which contained both dioctyl-sodium sulfosuccinate and calcium dinonylnaphthalenesulfonate in equivalent proportions. However Sample C turned hazy when subjected to aging. Sample D, which contained only calcium dinonylnaphthalenesulfonate, was clear after aging but possessed a substantially higher viscosity and a significantly lower total base number than Samples A, B or C which all contained dioctyl-sodium sulfosuccinate.

Sample A which contained a higher level of dioctyl-sodium sulfosuccinate than Sample B, achieved a higher total base number at a lower viscosity but exhibited a slight amount of haze after aging. This demonstrates the criticality of the relative molar proportion of dioctyl-sodium sulfosuccinate and calcium dinonylnaphthalene sulfonate. Thus, although the dioctyl-sodium sulfosuccinate alone is essential to achieve the high alkalinity and low viscosity product of the invention (compare the properties of Samples B and C), the calcium dinonylnaphthalenesulfonate is necessary to insure a heat and age stable product at least as indicated by solution clarity. (compare the properties of Samples B and D with the properties of sample C). Ideally, the calcium dinonylnaphthalenesulfonate is required to prevent temperature and age related problems while dioctyl-sodium sulfosuccinate is necessary to maintain the high alkalinity and low viscosity. Preferably, a specific proportion of calcium dinonylnaphthalenesulfonate relative to dioctyl-sodium sulfosuccinate is used in order to maintain optimum aging stability (compare Samples A and B).

The total base number-viscosity plot in FIG. 1 was prepared from data obtained from the products of Examples 1-4 (Samples A, B, C and D). FIG. 1 shows the relationship of the log $KV_{100}$ vs. TBN over a wide range for all of the samples. The viscosity of each sample was measured at several TBN values by adding a diluent oil to change the TBN value. The remainder of the line was extrapolated based on the data points obtained which are shown in FIG. 1. It will be noted that the dioctyl-sodium sulfosuccinate was an essential ingredient for a low viscosity product having a high TBN. (400 cst, log $KV_{100}$ = ~2.6, was taken as a reasonable viscosity maximum). The products prepared without the dioctyl-sodium sulfosuccinate reached the 400 cst viscosity at a significantly lower TBN (about 265). The TBN increase was about 15% for products made with dioctyl-sodium sulfosuccinate. It is believed that adjustments in the dioctyl-sodium sulfosuccinate and calcium dinonylnaphthalenesulfonate would further increase the TBN.

What is claimed is:

1. A highly alkaline, low viscosity overbased phenate sulfide reaction product which comprises a source of alkylated phenol, a source of sulfur, a source of an alkali or alkaline earth metal-containing reagent and a dispersant which comprises a dialkyl-metal sulfosuccinate.

2. The overbased phenate sulfide as described in claim 1 in which the alkyl groups of the dialkyl-metal sulfosuccinate contain 4 to 16 carbon atoms.

3. The overbased phenate sulfide as described in claim 2 in which the alkyl groups of the dialkyl-metal sulfosuccinate are butyl, pentyl, hexyl, octyl, decyl, dodecyl or ethylhexyl.

4. The overbased phenate sulfide as described in claim 1 in which the metal of the dialkyl-metal sulfosuccinate is lithium, sodium, potassium or calcium, magnesium, beryllium, strontium or barium.

5. The overbased phenate sulfide as described in claim 4 in which the dialkyl-metal sulfosuccinate is dioctyl-sodium sulfosuccinate.

6. The overbased phenate sulfide as described in claim 1 in which the dispersant also includes a metal hydrocarbylsulfonate.

7. The overbased phenate sulfide as described in claim 6 in which the metal hydrocarbylsulfonate contains an alkylated aromatic hydrocarbyl group containing at least 8 carbon atoms.

8. The overbased phenate sulfide as described in claim 7 in which the metal hydrocarbylsulfonate is a dinonylnaphthalene-sulfonate.

9. The overbased phenate sulfide as described in claim 8 in which the metal hydrocarbylsulfonate contains beryllium, magnesium, calcium, strontium, barium or radium.

10. The overbased phenate sulfide as described in claim 1 in which the amount of dialkyl-metal sulfosuccinate ranges from 1 to 20% based on the total amount of the alkylphenol.

11. The overbased phenate sulfide as described in claim 6 in which the molar proportion of dialkyl-metal sulfosuccinate to metal hydrocarbylsulfonate ranges from 1:1 to 2:10 moles of dialkyl-metal sulfosuccinate to metal hydrocarbylsulfonate.

12. The overbased phenate sulfide as described in claim 1 which includes a mineral oil, toluene, xylenes, a monohydric alcohol or a diol or mixture thereof as a solvent system.

13. The overbased phenate sulfide as described in claim 1 in which the source of alkali or alkaline earth metal reagent is an oxide or hydroxide of sodium, potassium, lithium, calcium, magnesium or strontium.

14. A process for preparing overbased metal phenate sulfides having improved viscometric properties, which comprises the steps of:
   a. combining at least one of a source of alkylated phenol, a source of sulfur and a source of an alkali or alkaline earth metal-containing reagent into a reaction mixture;
   b. treating the reaction mixture with carbon dioxide; and
   c. adding a dispersant composition which includes a dialkyl-metal sulfosuccinate during step a or step b or adding the dispersant during both of the steps.

15. The process as described in claim 14 in which the alkyl groups of the dialkyl-metal sulfosuccinate are butyl, pentyl, hexyl, octyl, decyl, dodecyl or ethylhexyl and the metal is lithium, sodium or potassium.

16. The process as described in claim 15 in which the dispersant composition includes a metal hydrocarbylsulfonate.

17. The process as described in claim 16 in which the dispersant includes calcium dinonylnaphthalenesulfonate.

18. The process as described in claim 17 in which the molar proportion of dialkyl-metal sulfosuccinate to metal hydrocarbylsulfonate ranges from 1:1 to 1:5 moles of dialkyl-metal sulfosuccinate to metal hydrocarbylsulfonate.

19. The process as described in claim 17 in which the dialkyl-metal sulfosuccinate is dioctyl-sodiumsulfosuccinate.

20. The process as described in claim 14 which includes blending a solvent system into the reaction mixture, the solvent system including a mineral oil, toluene, xylenes, monohydric alcohol or diol or a combination thereof.

21. The process of claim 14 in which the amount of dialkyl-metal sulfosuccinate ranges from 1 to 20% based on the total amount of the alkyl phenol.

22. The process of claim 16 in which the molar proportion of dialkyl-metal sulfosuccinate to metal hydrocarbylsulfonate ranges from 1:1 to 2:10 moles of dialkyl-metal sulfosuccinate to metal hydrocarbylsulfonate.

* * * * *